US012812304B2

(12) United States Patent
Xing et al.

(10) Patent No.: US 12,812,304 B2

(45) Date of Patent: Nov. 24, 2026

(54) PIEZOELECTRIC SENSING UNIT, PIEZOELECTRIC MICROPHONE, AND TERMINAL

(71) Applicant: HUAWEI TECHNOLOGIES CO., LTD., Shenzhen (CN)

(72) Inventors: Zengping Xing, Shenzhen (CN); Shengjie Ruan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 133 days.

(21) Appl. No.: 18/758,174

(22) Filed: Jun. 28, 2024

(65) Prior Publication Data

US 2024/0357295 A1 Oct. 24, 2024

Related U.S. Application Data

(63) Continuation of application No. PCT/CN2021/142707, filed on Dec. 29, 2021.

(51) Int. Cl.

*H04R 17/02* (2006.01)
*H04R 1/04* (2006.01)
*H04R 7/04* (2006.01)

(52) U.S. Cl.

CPC ............... *H04R 17/02* (2013.01); *H04R 1/04* (2013.01); *H04R 7/04* (2013.01)

(58) Field of Classification Search

CPC . H04R 1/04; H04R 7/04; H04R 17/02; H04R 2201/003; H04R 2410/03

See application file for complete search history.

(56) References Cited

U.S. PATENT DOCUMENTS

| | | | | |
|---|---|---|---|---|
| 9,055,372 | B2 | 6/2015 | Grosh et al. | |
| 10,825,982 | B1 | 11/2020 | Littrell et al. | |
| 10,999,684 | B1 | 5/2021 | Wan et al. | |
| 11,159,893 | B1 * | 10/2021 | Kervran | H04R 19/005 |
| 2014/0247954 | A1 | 9/2014 | Hall et al. | |

(Continued)

FOREIGN PATENT DOCUMENTS

| | | | |
|---|---|---|---|
| CN | 108017036 | A | 5/2018 |
| CN | 109495829 | A | 3/2019 |

(Continued)

OTHER PUBLICATIONS

Yu-Chen Chen et al, Design of Cantilever Diaphragm Array Piezoelectric MEMS Microphone for Signal-To-Noise Ratio Enhancement, Oct. 27-30, 2019, total 4 pages.

(Continued)

*Primary Examiner* — Paul W Huber

(57) ABSTRACT

A piezoelectric sensing unit, a piezoelectric microphone, and a terminal are disclosed. The piezoelectric sensing unit includes a base, an auxiliary layer, a central film, a piezoelectric film, and a plurality of cantilevers. The base has a cavity extending in a first direction, the cavity forms a polygonal opening on a first surface of the base, and the polygonal opening has a first side and a second side that are adjacent to each other. The auxiliary layer is formed on the first surface of the base, and includes a first auxiliary part located in a region that is on the first surface and adjacent to the first side. The cantilevers are one-to-one connected to sides of the polygonal opening in one-to-one correspondence.

16 Claims, 9 Drawing Sheets

(56) References Cited

U.S. PATENT DOCUMENTS

| | | | | |
|---|---|---|---|---|
| 2015/0350792 | A1 | 12/2015 | Grosh et al. | |
| 2016/0211439 | A1 | 7/2016 | Najafi et al. | |
| 2020/0382876 | A1* | 12/2020 | Cerini | H04R 17/02 |
| 2023/0121053 | A1* | 4/2023 | Campanella-Pineda | H04R 3/00 381/111 |

FOREIGN PATENT DOCUMENTS

| | | | |
|---|---|---|---|
| CN | 109587612 | A | 4/2019 |
| CN | 109587613 | A | 4/2019 |
| CN | 109803217 | A | 5/2019 |
| CN | 110519679 | A | 11/2019 |
| CN | 209659620 | U | 11/2019 |
| CN | 110545511 | A | 12/2019 |
| CN | 110545514 | A | 12/2019 |
| CN | 110602616 | A | 12/2019 |
| CN | 111048660 | A | 4/2020 |
| CN | 111050256 | A | 4/2020 |
| CN | 111148000 | A | 5/2020 |
| CN | 111372178 | A | 7/2020 |
| CN | 111405442 | A | 7/2020 |
| CN | 211296939 | U | 8/2020 |
| CN | 112423210 | A | 2/2021 |
| CN | 212519426 | U | 2/2021 |
| CN | 212572963 | U | 2/2021 |
| CN | 212850998 | U | 3/2021 |
| CN | 112752209 | A | 5/2021 |
| CN | 113163312 | A | 7/2021 |
| DE | 102013013402 | A1 | 2/2015 |

OTHER PUBLICATIONS

Qing-Ming Wang, Theoretical analysis of the sensor effect of cantilever piezoelectric benders, vol. 85, Issue 3, Feb. 1, 1999, total 12 pages.

Donghwan Kim et al, Piezoelectric micromachined microphones with out-of-plane directivity, vol. 103, Issue 1, Jul. 1, 2013, total 6 pages.

Robert John Littrell et al, High Performance Piezoelectric MEMS Microphones, Jan. 2010, total 111 pages.

Woon Seob Lee et al, Piezoelectric microphone built on circular diaphragm, Sensors and Actuators, Feb. 14, 2008, total 7 pages.

M Royer et al., ZnO on Si integrated acoustic sensor, Sensors and Actuators, May 31-Jun. 3, 1983, total 6 pages.

Extended European Search Report issued in EP21969497.3, dated Jan. 23, 2025, 8 pages.

* cited by examiner

PIEZOELECTRIC SENSING UNIT, PIEZOELECTRIC MICROPHONE, AND TERMINAL

CROSS-REFERENCE TO RELATED APPLICATION

This application is a continuation of International Application No. PCT/CN2021/142707, filed on Dec. 29, 2021, the disclosure of which is hereby incorporated by reference in its entirety.

TECHNICAL FIELD

This application relates to the field of microphone structure technologies, and in particular, to a piezoelectric sensing unit, a piezoelectric microphone, and a terminal.

BACKGROUND

A microphone is a common sound capture device, and is configured to convert a sound signal into an electrical signal. Microphones are classified into a dynamic microphone, a ribbon microphone, an electret microphone (ECM), a micro-electromechanical system (MEMS) capacitive microphone, and an MEMS piezoelectric microphone based on types. Most modern microphones are electret microphones and MEMS capacitive microphones. However, due to a process, the electret microphone is far less consistent in production and less stable in a temperature than the MEMS capacitive microphone. However, the MEMS capacitive microphone needs to use a charge pump to improve sensitivity, resulting in high power consumption. In contrast, the MEMS piezoelectric microphone can convert sound pressure into a charge output by using positive piezoelectric effect of a piezoelectric material provided that there is the sound pressure, resulting in low power consumption.

In the conventional technology, a piezoelectric microphone includes a base having a cavity. A cantilever is prepared in a region of the cavity of the base, and a piezoelectric material layer is prepared on the cantilever, to form a piezoelectric sensing unit of the piezoelectric microphone. In the conventional technology, the cantilever in the piezoelectric microphone usually extends from an edge of the cavity to a center of the cavity, or extends from a center of the cavity to an edge of the cavity, resulting in a short length of the cantilever. A relationship between a charge output of the microphone and pressure exerted on the cantilever has a strong correlation with a length of the cantilever. Therefore, in the conventional technology, the short length of the cantilever in the piezoelectric microphone results in poor charge output effect of the microphone.

SUMMARY

This application provides a piezoelectric sensing unit, a piezoelectric microphone, and a terminal, to improve a signal-to-noise ratio of the piezoelectric microphone and improve performance of the piezoelectric microphone.

According to a first aspect, this application provides a piezoelectric sensing unit. The piezoelectric sensing unit includes a base, an auxiliary layer, a central film, a piezoelectric film, and a plurality of cantilevers. The base has a cavity extending in a first direction, the cavity forms a polygonal opening on a first surface of the base, and the polygonal opening has a first side and a second side that are adjacent to each other. The auxiliary layer is formed on the first surface of the base, the auxiliary layer includes a first auxiliary part, and the first auxiliary part is located in a region that is on the first surface and that is adjacent to the first side. The cantilevers are one-to-one connected to sides of the polygonal opening. Each of the cantilevers includes a first end part and a second end part, the first end part is connected to the first auxiliary part, and a connection point between the first end part and the first auxiliary part is located on a side that is of the first auxiliary part and that is close to the second side. In addition, the cantilever extends in an extension direction of the second side. In this case, a length of the cantilever is long, to help improve a signal-to-noise ratio of a piezoelectric microphone. The central film is connected to the second end part of each of the cantilevers, and an orthographic projection of the polygonal opening on a first plane completely covers an orthographic projection of the central film on the first plane, where the first plane is perpendicular to the first direction. The central film is opposite to the cavity of the base. In this case, after a sound wave enters the cavity, the central film may be driven to vibrate, to drive the cantilever to swing. The piezoelectric film is disposed on a surface of the cantilever. The piezoelectric film includes a piezoelectric material layer, a first electrode layer, and a second electrode layer, and the piezoelectric material layer is connected to the first electrode layer and the second electrode layer. In this case, the piezoelectric film may convert swing of the cantilever into an electrical signal.

The cantilever includes a first edge and a second edge, and the first edge and the second edge are connected between the first end part and the second end part. At least one of the first edge and the second edge is parallel to the second side of the polygon.

In an optional implementation, the central film and the cantilever may form an integrated structure, to prepare the piezoelectric sensing unit. According to this solution, a process of preparing the piezoelectric sensing unit can be simplified, and reliability of a connection between the central film and the cantilever can be further improved.

The central film may be provided with a hole. Certainly, a quantity of holes and a shape of the hole are not limited. The hole of the central film can release some sound pressure, to increase an acoustic overload point of the piezoelectric sensing unit.

The central film and the cantilever may be located on a same plane, or the central film and the cantilever may be located on different planes, to dispose the central film and the cantilever. When the central film and the cantilever are located on different planes, the central film may be located on a side that is of the cantilever and that faces the base, and the central film is connected to the cantilever through the connection part. In this solution, sensitivity of the piezoelectric sensing unit is high, and performance of the piezoelectric microphone having the piezoelectric sensing unit is also good.

Because the central film and the cantilever are disposed on different planes, at least a partial structure of the central film may overlap the cantilever. In this case, an area of the central film may be large, to increase effectively input sound pressure and improve performance of the piezoelectric microphone.

The connection part may include a first connection part and a second connection part. The first connection part and the cantilever may form an integrated structure, and the second connection part is connected to the first connection part and the central film. According to this solution, connection strength between the central film and the cantilever can be improved, and a service life of the piezoelectric sensing unit can be improved.

When a connection between the first connection part and the second connection part is specifically implemented, the first connection part may have a plurality of first connection holes, and the second connection part is connected to the plurality of first connection holes. In this way, reliability of the connection between the first connection part and the second connection part is improved.

In addition, the second connection part may be further connected to the cantilever, so that the central film is connected to the cantilever. The cantilever may include at least one second connection hole, and the second connection part is connected to the second connection hole. According to this solution, connection strength between the central film and the cantilever can be improved. This further helps enable the central film to be in an expanded state.

When the first edge of the cantilever is not parallel to the second edge of the cantilever, a width of the cantilever in a direction perpendicular to the second side may be a first width. The first width gradually decreases from the first end part to the second end part. In this solution, a width of a joint between the cantilever and the first auxiliary part is large, and therefore a stress near the first end part of the cantilever is large. This helps convert, into an electrical signal, vibration generated by a sound wave, and then improve signal conversion efficiency. In addition, the first width of the second end part is small. In this case, an area of the central film may be designed to be large. This can increase effectively input sound pressure and improve performance of the piezoelectric microphone.

The first edge and/or the second edge of the cantilever are/is perpendicular to the first side connected to the cantilever. In other words, at least one of the first edge and the second edge is perpendicular to the first side. In this way, the cantilever may be perpendicular to the first side, to reduce torque of a root part of the cantilever.

To implement a perpendicular connection between the cantilever and the first side, the first side of an inner cavity of the base may have a groove or protrusion corresponding to the cantilever. It should be noted that the first side may have the groove, to help increase the length of the cantilever.

An effective region of the piezoelectric film is located on a side that is of the cantilever and that is close to the first auxiliary part connected to the cantilever. Because a stress of a region in which the cantilever is connected to the first connection part is large, signal conversion efficiency can be improved, and performance of the piezoelectric microphone can be improved.

The central film may further have an additional mass block. The additional mass block may enable a large swing amplitude of the central film when the central film receives sound pressure, to improve sensitivity of the piezoelectric sensing unit.

In an optional technical solution, lengths of the plurality of cantilevers in the piezoelectric sensing unit may be the same or may be different. This is not limited in this application. Lengths of the plurality of cantilevers are different. When the lengths of the plurality of cantilevers are different, the piezoelectric microphone may have different low-frequency resonant points, and low-frequency sensitivity is high. This can improve a voiceprint recognition capability.

In an optional technical solution, a material of the cantilever is not limited. In a technical solution, the material of the cantilever may be different from that of the piezoelectric material layer, and the cantilever is merely used as a structure layer, and includes only one piezoelectric material layer. In this case, the piezoelectric sensing unit is a piezoelectric sensing unit in a unimorph mode. In another technical solution, a material of the cantilever may alternatively be the same as that of the piezoelectric material layer. In other words, the cantilever is also used as the piezoelectric material layer. In this case, the piezoelectric sensing unit is a piezoelectric sensing unit in a bimorph mode.

The auxiliary layer and the cantilever may form an integrated structure, to prepare the piezoelectric microphone. This can facilitate preparation of the auxiliary layer and the cantilever to simplify a preparation process. In addition, reliability of a connection between the auxiliary layer and the cantilever is improved.

According to a second aspect, this application further provides a piezoelectric microphone. The piezoelectric microphone includes a circuit board, a chip, and the piezoelectric sensing unit according to the first aspect. The foregoing chip is disposed on the circuit board, and the first electrode and the second electrode are connected to the chip, so that the piezoelectric sensing unit can process an electrical signal converted from a sound wave.

In an optional technical solution, the piezoelectric microphone further includes a housing, and the circuit board, the chip, and the piezoelectric sensing unit are disposed inside the housing. The housing may protect the circuit board, the chip, and the piezoelectric sensing unit inside, and may also shield interference.

According to a third aspect, this application further provides a terminal. The terminal includes the piezoelectric microphone according to the second aspect. A sound reception effect of the terminal is good. A specific type of the terminal is not limited. For example, the terminal may be a terminal that needs to record a sound, for example, a mobile phone, a headset, an intelligent device, a voice recorder, a hearing aid, a microphone, a voice control device, or a vehicle-mounted voice interaction device.

REFERENCE NUMERALS

Figure 1:
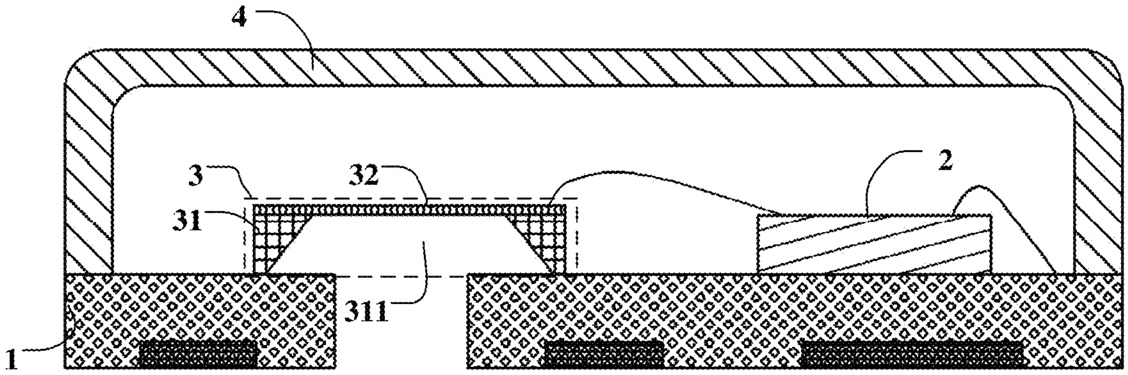
FIG. 1 is a diagram of a structure of an example piezoelectric microphone according to an embodiment of this application.

| | |
|---|---|
| 1: circuit board; | 2: chip; |
| 3: piezoelectric sensing unit; | 31: base; |
| 311: cavity; | 312: first surface; |
| 313: polygonal opening; | 3131: first side; |
| 3132: second side; | 3133: groove; |
| 32: cantilever; | 321: first end part; |
| 322: second end part; | 323: first edge; |
| 324: second edge; | 325: second connection hole; |
| 33: piezoelectric film; | 331: piezoelectric material layer; |
| 332: first electrode layer; | 333: second electrode layer; |
| 334: effective working region; | 34: first electrode; |
| 35: second electrode; | 36: auxiliary layer; |
| 361: first auxiliary part; | 37: central film; |
| 371: hole; | 372: additional mass block; |
| 38: connection part; | 381: first connection part; |
| 3811: first connection hole; | 382: second connection part; |
| 4: housing. | |

DESCRIPTION OF EMBODIMENTS

For ease of understanding, embodiments of this application provide a piezoelectric sensing unit, a piezoelectric microphone, and a terminal. The following describes an application scenario of the piezoelectric sensing unit, the piezoelectric microphone, and the terminal. As a common sound capture device, microphones are currently used in various terminals, to implement functions such as calling or sound control of the terminals. Types of the microphones also change gradually. Because an MEMS piezoelectric microphone has low power consumption, the MEMS piezoelectric microphone is an important research direction of a person skilled in the art. A cantilever in an existing piezoelectric microphone usually extends from an edge of a cavity to a center of the cavity, or extends from a center of a cavity to an edge of the cavity, resulting in a short length of the cantilever. A relationship between a charge output of the microphone and pressure exerted on the cantilever has a strong correlation with a length of the cantilever. Therefore, in the conventional technology, the short length of the cantilever in the piezoelectric microphone results in poor charge output effect of the microphone.

The following describes in detail embodiments of this application with reference to accompanying drawings. Terms used in the following embodiments are merely intended to describe specific embodiments, but are not intended to limit this application. The terms "one", "a" and "this" of singular forms used in this specification and the appended claims of this application are also intended to include expressions such as "one or more", unless otherwise specified in the context clearly.

Reference to "an embodiment" or "a specific embodiment" or the like described in the specification means that one or more embodiments of this application include a specific feature, structure, or characteristic described with reference to the embodiment. The terms "include", "contain", "have", and variants thereof all mean "include but are not limited to", unless otherwise specifically emphasized in another manner.

This application provides a terminal. The terminal includes a piezoelectric microphone, and the piezoelectric microphone is used for recording a sound. A specific type of the terminal is not limited. For example, the terminal may be a terminal that needs to record a sound, for example, a mobile phone, a headset, an intelligent device, a voice recorder, a hearing aid, a microphone, a voice control device, or a vehicle-mounted voice interaction device.

FIG. 1 is a diagram of a structure of an example piezoelectric microphone according to an embodiment of this application. As shown in FIG. 1, the piezoelectric microphone in this embodiment includes a circuit board 1, a chip 2, and a piezoelectric sensing unit 3. The chip 2 is disposed on the circuit board 1. The chip 2 may be electrically connected to the circuit board 1. The piezoelectric sensing unit 3 includes a base 31 and a cantilever 32 and a piezoelectric film (which is not shown in the figure) that are formed on the base 31. The base 31 has a cavity 311, a first end part 321 of the cantilever 32 is connected to the base 31 and suspended on the cavity 311, and the piezoelectric film is disposed on a surface of the cantilever 32. The piezoelectric film can receive vibration of a sound wave and convert the vibration into an electrical signal. The piezoelectric film of the piezoelectric sensing unit 3 is electrically connected to the chip 2, so that the chip 2 can process the electrical signal generated after the piezoelectric sensing unit 3 receives the sound wave. For example, the chip 2 performs processing like collection, amplification, and filtering on the electrical signal, and then may further output an analog signal or a digital signal. In this solution, the sound wave may be converted into the electrical signal by using a positive piezoelectric feature of a piezoelectric material layer in the piezoelectric film, and no other driver needs to be configured. This helps reduce a size of the piezoelectric microphone, reduce power consumption of the piezoelectric microphone, and improve use duration of the piezoelectric microphone, and then improve use duration of a terminal having the piezoelectric microphone.

Still as shown in FIG. 1, the piezoelectric microphone may further include a housing 4. The circuit board 1, the chip 2, and the piezoelectric sensing unit 3 are disposed inside the housing 4. The housing 4 may shield an interference signal, and may protect components disposed inside the housing.

There are two manners of packaging the piezoelectric microphone. One manner is bottom opening packaging, and the other manner is top opening packaging. The piezoelectric microphone in the embodiment shown in FIG. 1 is a piezoelectric microphone packaged with a bottom opening, and the piezoelectric microphone packaged with the bottom opening is suitable for a thin product. In this embodiment, the piezoelectric sensing unit 3 and the chip 2 are separately installed on the circuit board 1, and there is an opening in a region that is of the circuit board 1 and that is opposite to the cavity 311 of the piezoelectric sensing unit 3, where the opening corresponds to a sound inlet. In this packaging manner, no opening needs to be disposed in the housing 4.

Figure 2:
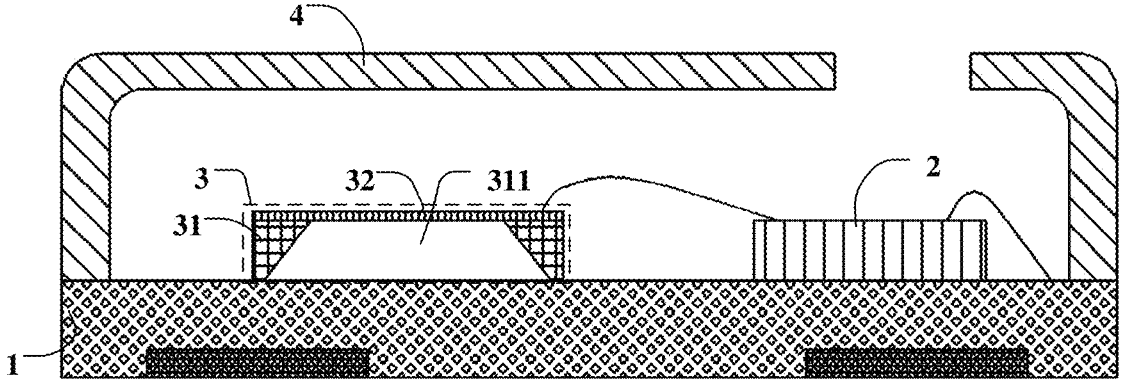
FIG. 2 is a diagram of another structure of an example piezoelectric microphone according to an embodiment of this application.

FIG. 2 is a diagram of another structure of an example piezoelectric microphone according to an embodiment of this application. The piezoelectric microphone in the embodiment shown in FIG. 2 is a piezoelectric microphone packaged with a top opening. In this embodiment, the piezoelectric sensing unit 3 and the chip 2 are separately installed on the circuit board 1, but the circuit board 1 has no opening, the housing 4 has an opening, and the opening of the housing 4 is used as a sound inlet hole.

Figure 3:
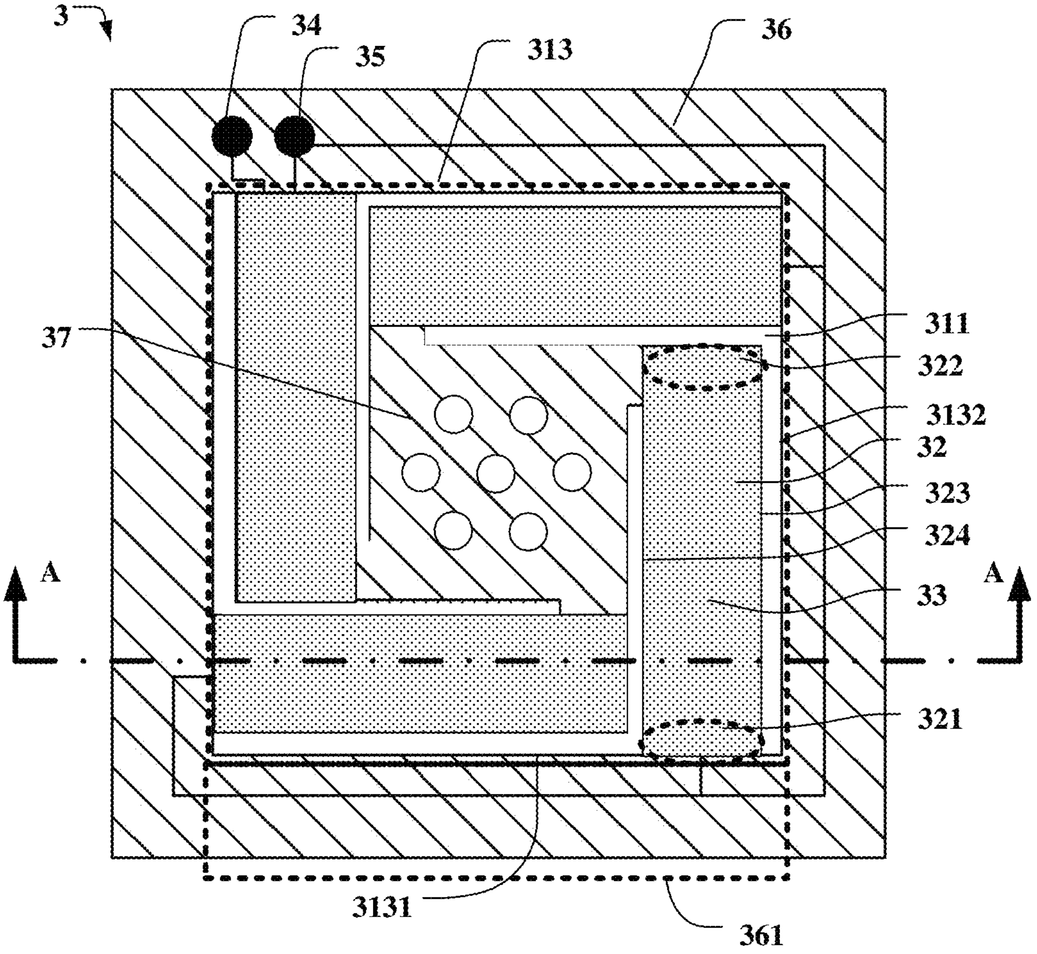
FIG. 3 is a diagram of a top-view structure of an example piezoelectric sensing unit according to an embodiment of this application.
Figure 4:
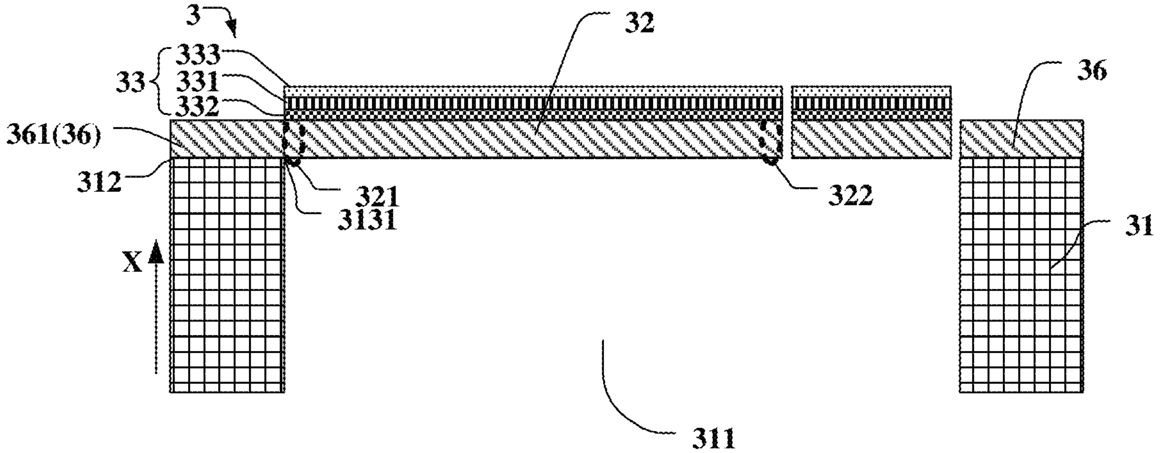
FIG. 4 is a diagram of a lateral sectional-view structure of an example piezoelectric sensing unit according to an embodiment of this application.

FIG. 3 is a diagram of a top-view structure of an example piezoelectric sensing unit according to an embodiment of this application. FIG. 4 is a diagram of a lateral sectional-view structure of a piezoelectric sensing unit according to an embodiment of this application. FIG. 4 is a diagram of a sectional-view structure at A-A in FIG. 3. As shown in FIG. 3 and FIG. 4, the piezoelectric sensing unit 3 includes a base 31, an auxiliary layer 36, a plurality of cantilevers 32, a central film 37, and a piezoelectric film 33. The base 31 is an overall support part of the piezoelectric sensing unit 3. The base 31 forms a cavity 311 extending in a first direction X, and the cavity 311 may form a cavity for sound transmission. It may be considered that the cavity 311 is of a tubular structure, has a side wall connected in a closed manner on a peripheral side, and has a first opening and a second opening that are opposite to each other. A direction of the first opening toward the second opening may be considered as the first direction X. The cavity 311 forms a polygonal opening 313 on a first surface 312 of the base 31, or the base 31 has a polygonal opening 313 on a first surface 312. The polygonal opening 313 is an opening of the cavity 311. The auxiliary layer 36 is formed on the first surface 312 of the base 31, and may be configured to connect to the plurality of cantilevers 32. It may be considered that the polygonal opening 313 includes a first side 3131 and a second side 3132 that are adjacent to each other, and the auxiliary layer 36 includes a first auxiliary part 361. The first auxiliary part 361 is located in a region that is of the first surface 312 of the base 31 and that is adjacent to the first side 3131. In other words, the first auxiliary part 361 is provided on the first surface 312 that is of the base 31 and that corresponds to the first side 3131. The plurality of cantilevers 32 one-to-one correspond to sides of the polygonal opening 313. The cantilever 32 includes a first end part 321 and a second end part 322 that are opposite to each other. The first end part 321 is connected to a side that is of the first auxiliary part 361 and that is close to the second side 3132, and the cantilever 32 extends in an extension direction of the second side 3132. The central film 37 is connected to the second end part 322 of each cantilever 32. In this case, the central film 37 vibrates when receiving a sound wave, to drive the cantilever 32 to vibrate. An orthographic projection of the polygonal opening 313 on a first plane completely covers an orthographic projection of the central film 37 on the first plane, where the first plane is perpendicular to the first direction X. In this way, the central film 37 can freely move in the cavity 311 of the base 31, to vibrate under driving of the sound wave. The piezoelectric film 33 is disposed on a surface of the cantilever 32. The piezoelectric film 33 includes a piezoelectric material layer 331, a first electrode layer 332, and a second electrode layer 333, and the piezoelectric material layer 331 is connected to the first electrode layer 332 and the second electrode layer 333. The piezoelectric material layer 331 has a piezoelectric feature. When physical deformation occurs, a charge is generated, and an intensity of the charge is related to an intensity of the deformation. In this way, as the cantilever 32 vibrates, the piezoelectric material layer 331 generates a charge, and may transmit the charge through the first electrode layer 332 and the second electrode layer 333, to convert a sound signal into an electrical signal.

In this embodiment, the first end part 321 of the cantilever 32 is connected to the first auxiliary part 361 adjacent to the first side 3131, a specific connection point between the cantilever 32 and the first auxiliary part 361 is close to a direction of the second side 3132, and the cantilever 32 extends in the extension direction of the second side 3132. In this case, a maximum length of the cantilever 32 may be close to a length of the second side 3132. In this solution, space of the opening of the cavity 311 can be fully used, so that a length of the cantilever 32 is long. In this embodiment, the piezoelectric sensing unit 3 may be a piezoelectric sensing unit in a unimorph mode, or may be a piezoelectric sensing unit in a bimorph mode. A related item OPT ($SNR \propto 10 \, \text{Log}(OPT)$) of cantilever signal-to-noise ratio (SNR) optimization in the two modes is:

$$OPT_{Bimorph} \propto \frac{d_{31}^2}{\varepsilon \cdot \tan(\theta)} \cdot \frac{w \cdot L^5}{t^3}$$

$$OPT_{unimorph} \propto \frac{d_{31}^2}{\varepsilon \cdot \tan(\theta)} \cdot \frac{w \cdot L^5}{t^3} \cdot \frac{q_{uni}}{2}$$

Herein, ε is a dielectric constant, tan (θ) is a dielectric loss, $d_{31}$ is a piezoelectric constant, w is a width of the cantilever 32, L is a length of the cantilever 32, t is a thickness of the cantilever 32, and $q_{uni}$ is a structure parameter ratio. It can be learned that the related item OPT and the length of the cantilever 32 are in a fifth power relationship, that is, the length of the cantilever 32 has great impact on a signal-to-noise ratio. In this embodiment, when a size of the cavity 311 is fixed, the length of the cantilever 32 may be longer, and a signal-to-noise ratio of the piezoelectric microphone is also greater.

It may be understood that the plurality of cantilevers 32 one-to-one correspond to sides of the polygonal opening 313. In this case, each side of the polygonal opening 313 may be understood as the first side 3131 under different references. Similarly, a region that is of the auxiliary layer 36 and that is adjacent to each side of the polygon opening also forms the first auxiliary part 361 in the case of the first side 3131. To be specific, if a specific cantilever 32 is used as a reference, the auxiliary layer 36 connected to the cantilever 32 is the first auxiliary part 361, and a side of the polygon adjacent to the first auxiliary part 361 is the first side 3131. That is, when different cantilevers 32 are used as references, each side of the polygonal opening 313 may be formed as the first side 3131, and a part that is of the auxiliary layer 36 and that is opposite to the polygonal opening 313 may be the first auxiliary part 361.

As shown in FIG. 3, the piezoelectric sensing unit 3 may further include a first electrode 34 and a second electrode 35. The first electrode layer 332 of the piezoelectric film 33 of each cantilever 32 is connected to the first electrode 34, and the second electrode layer 333 of the piezoelectric film 33 of each cantilever 32 is connected to the second electrode 35. It should be noted that all first electrode layers 332 may be connected in series or in parallel, and all second electrode layers 333 may be connected in series or in parallel. This is not limited in this application. The first electrode layers and the second electrode layers may be designed based on an actual requirement of the piezoelectric microphone.

In an optional technical solution, in this embodiment, the piezoelectric sensing unit 3 may be a piezoelectric sensing unit in a unimorph mode, or may be a piezoelectric sensing unit in a bimorph mode. When the piezoelectric sensing unit 3 is the piezoelectric sensing unit in the unimorph mode, the cantilever 32 is a base material, and a material of the cantilever 32 is different from a material of the piezoelectric material layer. For example, the cantilever 32 may be made of a silicon-containing material. In another embodiment, when the piezoelectric sensing unit 3 is the piezoelectric sensing unit in the bimorph mode, a material of the cantilever 32 is the same as that of the piezoelectric material layer. In other words, the cantilever is also used as the piezoelectric material layer. Certainly, in some embodiments, the cantilever 32 may alternatively be used as a base material, and two piezoelectric material layers are disposed on the surface of the cantilever, so that the piezoelectric sensing unit in the bimorph mode is formed.

As shown in FIG. 3, the cantilever 32 includes a first edge 323 and a second edge 324 that are opposite to each other, and the first edge 323 and the second edge 324 are separately connected between the first end part 321 and the second end part 322. At least one of the first edge 323 and the second edge 324 is parallel to the second side 3132 of the polygonal opening 313. In this embodiment, the length of the cantilever 32 may be close to the length of the second side 3132. To be specific, the length of the cantilever 32 may be longer, and a smaller area of the middle region of the polygonal opening 313 is occupied, so that an area of the central film 37 is large. This helps increase effectively input sound pressure. In this solution, an area of the polygonal opening 313 can be fully used, so that performance of the piezoelectric microphone is improved.

Figure 5:
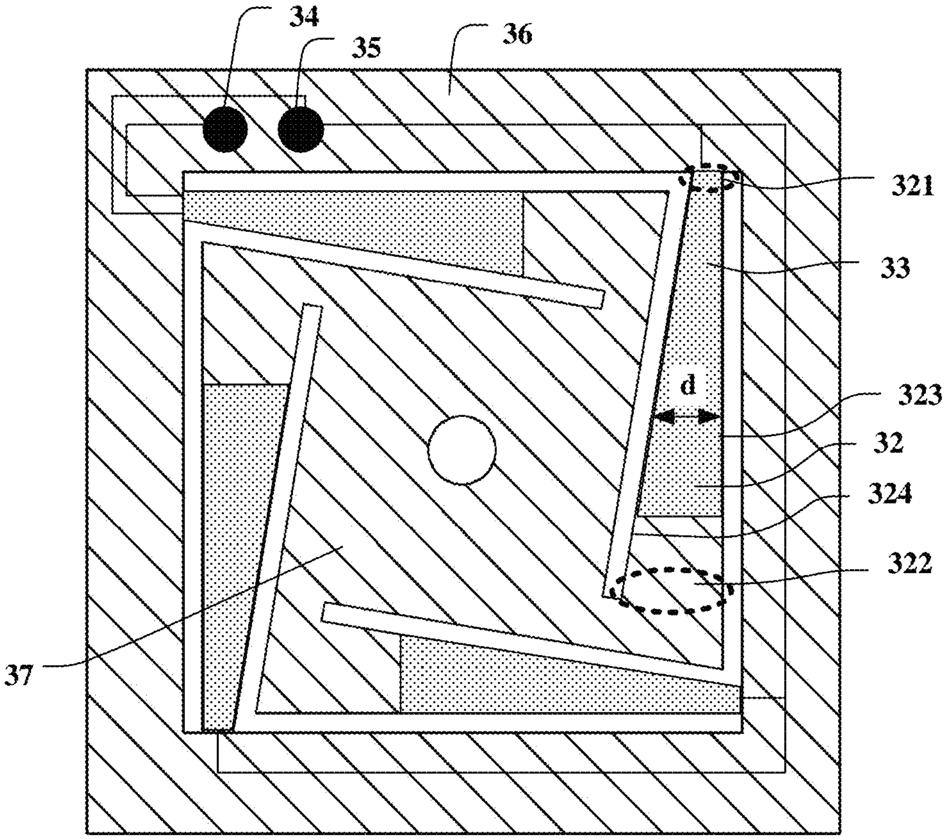
FIG. 5 is a diagram of another top-view structure of an example piezoelectric sensing unit according to an embodiment of this application.
Figure 6:
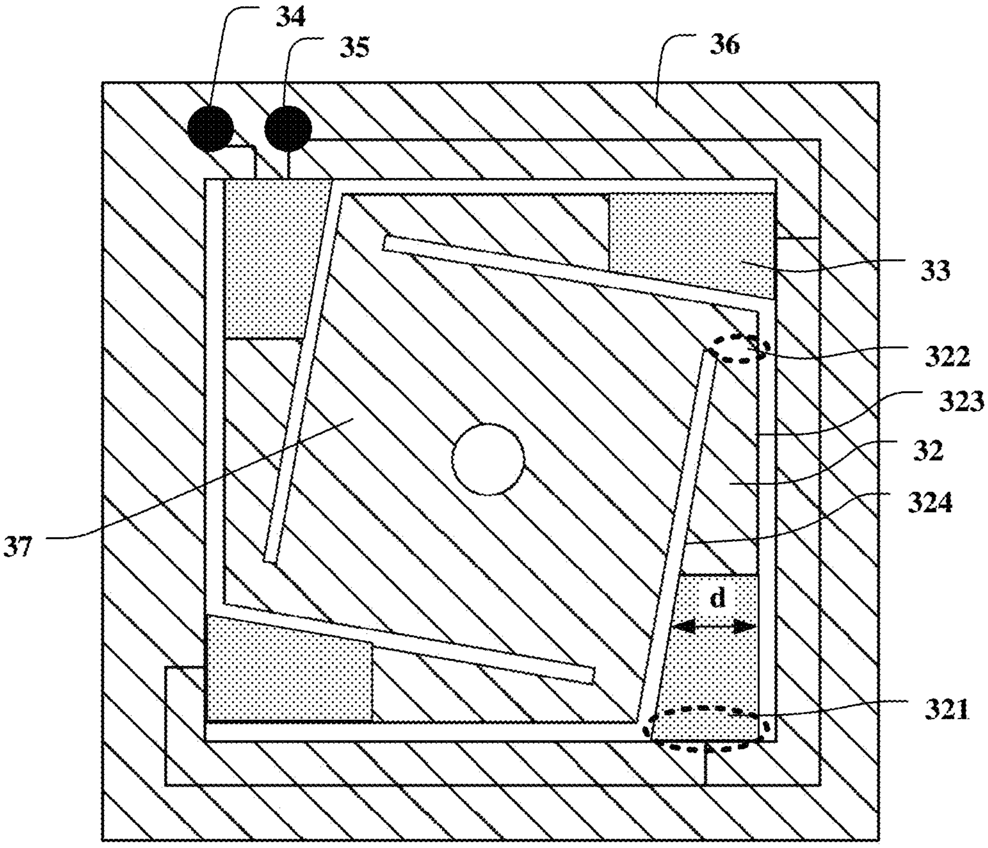
FIG. 6 is a diagram of another top-view structure of an example piezoelectric sensing unit according to an embodiment of this application.

In a specific implementation, as shown in FIG. 3, the first edge 323 may be parallel to the second edge 324. In this case, both the first edge 323 and the second edge 324 are parallel to the second side 3132. Alternatively, FIG. 5 and FIG. 6 are diagrams of other two top-view structures of the piezoelectric sensing unit. In another embodiment, the first edge 323 may not be parallel to the second edge 324, and only the first edge 323 may be parallel to the second side 3132, but the second edge 324 may not be parallel to the second side 3132.

Still as shown in FIG. 5, when the first edge 323 is not parallel to the second edge 324, a width of the cantilever 32 in a direction perpendicular to the second side 3132 is used as a first width d. In this case, the first width d may gradually increase from the first end part 321 to the second end part 322 of the cantilever 32. In this solution, a width of a joint between the cantilever 32 and the first auxiliary part 361 is small, and therefore much space may be reserved for an adjacent cantilever 32. This helps increase the length of the cantilever 32, and then improve the OPT and the SNR.

Still as shown in FIG. 6, when the first edge 323 is not parallel to the second edge 324, a width of the cantilever 32 in a direction perpendicular to the second side 3132 is used as a first width d. In this case, the first width d may gradually decrease from the first end part 321 to the second end part 322 of the cantilever 32. In this solution, a width of a joint between the cantilever 32 and the first auxiliary part 361 is large. Because a stress near the first end part 321 of the cantilever 32 is large, in this embodiment, an area of a region with a large stress on the cantilever 32 may be large. This helps convert, into an electrical signal, vibration generated by a sound wave, and then improve signal conversion efficiency. In addition, the first width of the second end part 322 is small. In this case, an area of the central film 37 may be designed to be large. This can increase effectively input sound pressure and improve performance of the piezoelectric microphone.

Still as shown in FIG. 4 to FIG. 6, at least one of the first edge 323 and the second edge 324 of the cantilever 32 may be perpendicular to the first side 3131 connected to the cantilever 32, to dispose the cantilever 32. In this embodiment, the cantilever 32 may be perpendicular to the first side 3131. In this way, in a vibration process of the cantilever 32, a torque phenomenon does not easily occur at a joint between the first end part 321 and the first auxiliary part 361. This helps generate an effective charge output.

Figure 7:
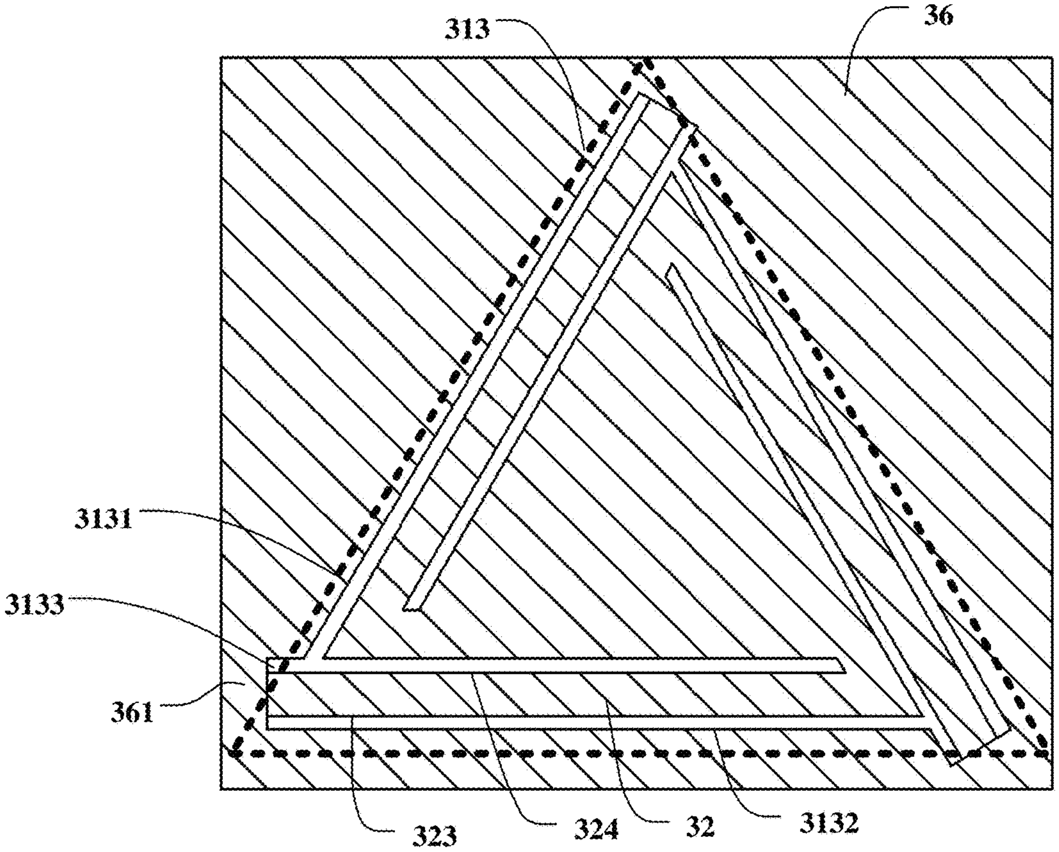
FIG. 7 is a diagram of another top-view structure of an example piezoelectric sensing unit according to an embodiment of this application.

FIG. 7 is a diagram of another top-view structure of an example piezoelectric sensing unit according to an embodiment of this application. It should be noted that, for ease of expressing features, FIG. 7 simplifies some features of the accompanying drawing, and shows only two layers of structures: the auxiliary layer 36 and the cantilever 32. As shown in FIG. 7, the first side 3131 is not necessarily perpendicular to the second side 3132. In other words, the polygonal opening is not necessarily a square opening, or may be another polygonal opening like a triangular opening or a pentagonal opening. The polygonal opening of the piezoelectric sensing unit shown in FIG. 7 is a triangular opening. Therefore, to enable at least one of the first edge 323 and the second edge 324 to be perpendicular to the first side 3131 connected to the cantilever 32, the first side 3131 may have a protrusion or groove 3133 corresponding to the cantilever 32. To be specific, the cantilever 32 is connected to the first auxiliary part 361 corresponding to a location of the protrusion or groove 3133, and it is ensured that at least one of the first edge 323 and the second edge 324 is perpendicular to the first side 3131 connected to the cantilever 32. In a preferred embodiment, the first side 3131 may have the groove 3133. This helps increase the length of the cantilever 32.

Figure 8:
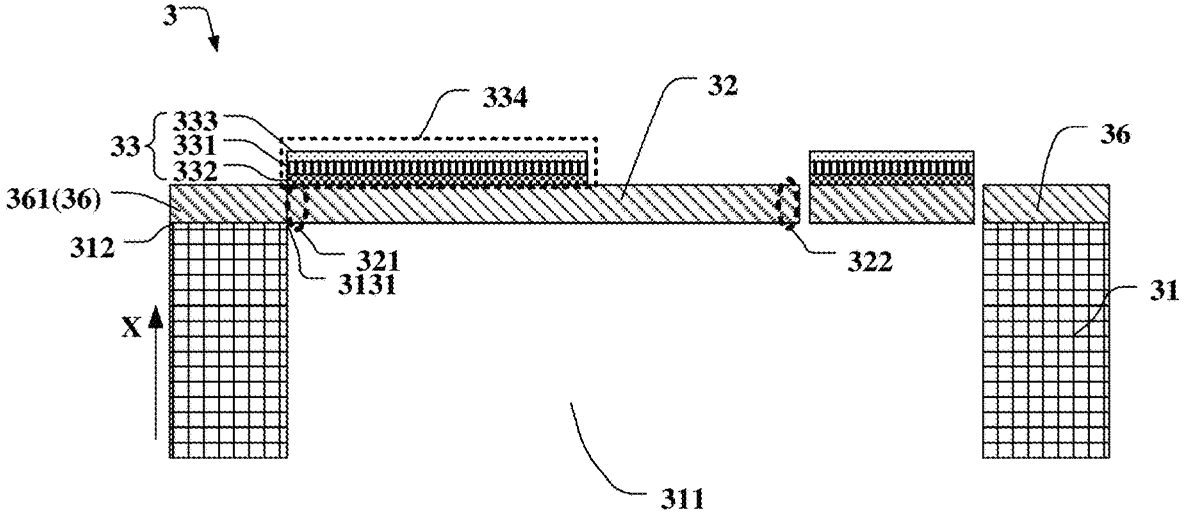
FIG. 8 is a diagram of another lateral sectional-view structure of an example piezoelectric sensing unit according to an embodiment of this application.

FIG. 8 is a diagram of another lateral sectional-view structure of an example piezoelectric sensing unit according to an embodiment of this application. As shown in FIG. 8, an effective working region 334 of the piezoelectric film 33 may be located on a side that is of the cantilever 32 and that is close to the first auxiliary part 361 connected to the cantilever 32, to prepare the piezoelectric film 33 on the surface of the cantilever 32. In other words, the effective working region 334 of the piezoelectric film 33 is located near a root of the cantilever 32. Because a stress on the side that is of the cantilever 32 and that is close to the first auxiliary part 361 connected to the cantilever 32 is large, when the effective working region 334 of the piezoelectric film 33 is located on the side, signal conversion efficiency can be improved, and performance of the piezoelectric microphone can be improved.

The effective working region 334 is a region in which the piezoelectric film 33 can convert deformation of the piezoelectric material layer 331 into an electrical signal. The effective working region 334 may be a region in which the piezoelectric film 33 have the first electrode layer 332, the piezoelectric material layer 331, and the second electrode layer 333.

Figure 9:
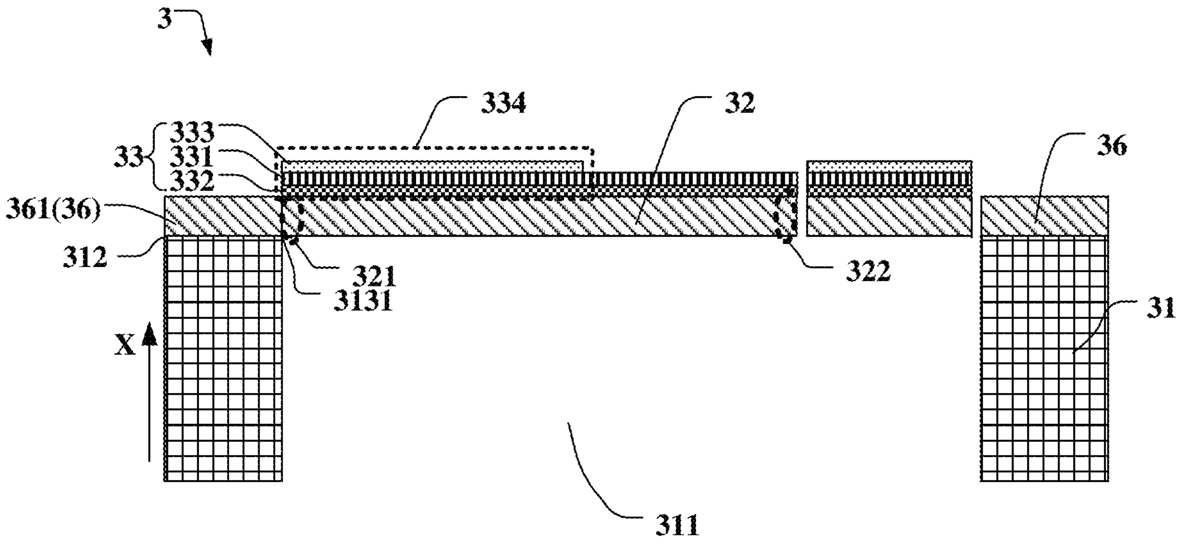
FIG. 9 is a diagram of another lateral sectional-view structure of an example piezoelectric sensing unit according to an embodiment of this application.

In a specific implementation, the piezoelectric film 33 may be overall located on a side that is of the cantilever 32 and that is close to the first auxiliary part 361 connected to the cantilever 32, as shown in FIG. 6 and FIG. 8. Alternatively, FIG. 9 is a diagram of another lateral sectional-view structure of an example piezoelectric sensing unit according to an embodiment of this application. As shown in FIG. 9, in another embodiment, only at least one of the first electrode layer 332 and the second electrode layer 333 may be disposed on a side that is of the cantilever 32 and that is close to the first auxiliary part 361 connected to the cantilever 32, and the piezoelectric material layer 331 covers the entire cantilever 32. In this solution, a manufacturing process of the piezoelectric film 33 can be simplified.

Certainly, in another embodiment, for example, in the embodiment shown in FIG. 3, the piezoelectric film 33 may alternatively completely cover the entire cantilever 32. This is not limited in this application.

A specific manner of preparing the first electrode layer 332 and the second electrode layer 333 is not limited. In an embodiment, as shown in FIG. 8 and FIG. 9, the first electrode layer 332 and the second electrode layer 333 may be disposed on surfaces on two sides of the piezoelectric material layer 331. In other words, the first electrode layer 332, the piezoelectric material layer 331, and the second electrode layer 333 are stacked in sequence. In another embodiment, the first electrode layer 332 and the second electrode layer 333 form interdigital electrodes. In a specific embodiment, the first electrode layer 332 and the second electrode layer 333 may be located on a surface on a same side of the piezoelectric material layer 331. Certainly, in another embodiment, the first electrode layer 332, the piezoelectric material layer 331, and the second electrode layer 333 may be stacked in sequence, to indicate that the first electrode layer 332 is of an interdigital structure, and the second electrode layer 333 is of an interdigital structure. This is not limited in this application.

Still as shown in FIG. 5 to FIG. 7, the auxiliary layer 36 and the cantilever 32 may form an integrated structure, to prepare the auxiliary layer 36 and the cantilever 32. The solution facilitates preparation of the auxiliary layer 36 and the cantilever 32, and the auxiliary layer 36 and the cantilever 32 may be formed by using a one-time process, so that a preparation process is simplified. In addition, a connection between the cantilever 32 and the auxiliary layer 36 may be reliable, so that structural reliability of the piezoelectric sensing unit 3 is improved.

In addition, the central film 37 and the cantilever 32 may alternatively form an integrated structure. Similarly, the solution facilitates preparation of the central film 37 and the cantilever 32, and the central film 37 and the cantilever 32 may be formed by using a one-time process, so that a preparation process is simplified. In addition, a connection between the cantilever 32 and the central film 37 may be reliable, so that structural reliability of the piezoelectric sensing unit 3 is improved.

In a specific embodiment, the central film 37, the cantilever 32, and the auxiliary layer 36 may form an integrated structure. In this case, the central film 37, the cantilever 32, and the auxiliary layer 36 may be formed by using a one-time process, so that the process is simplified to a large extent.

As shown in FIG. 5 and FIG. 6, the central film 37 may have a hole 371. A specific quantity of holes 371 is not limited. For example, as shown in FIG. 5 and FIG. 6, the central film 37 may have one hole 371. Alternatively, as shown in FIG. 3, the central film 37 may alternatively have two or more holes 371. In addition, a shape of the hole is not limited. The hole may be a round hole, a square hole, or the like. In this solution, the hole can release some sound pressure, to increase an acoustic overload point (AOP) of the piezoelectric sensing unit.

Figure 10:
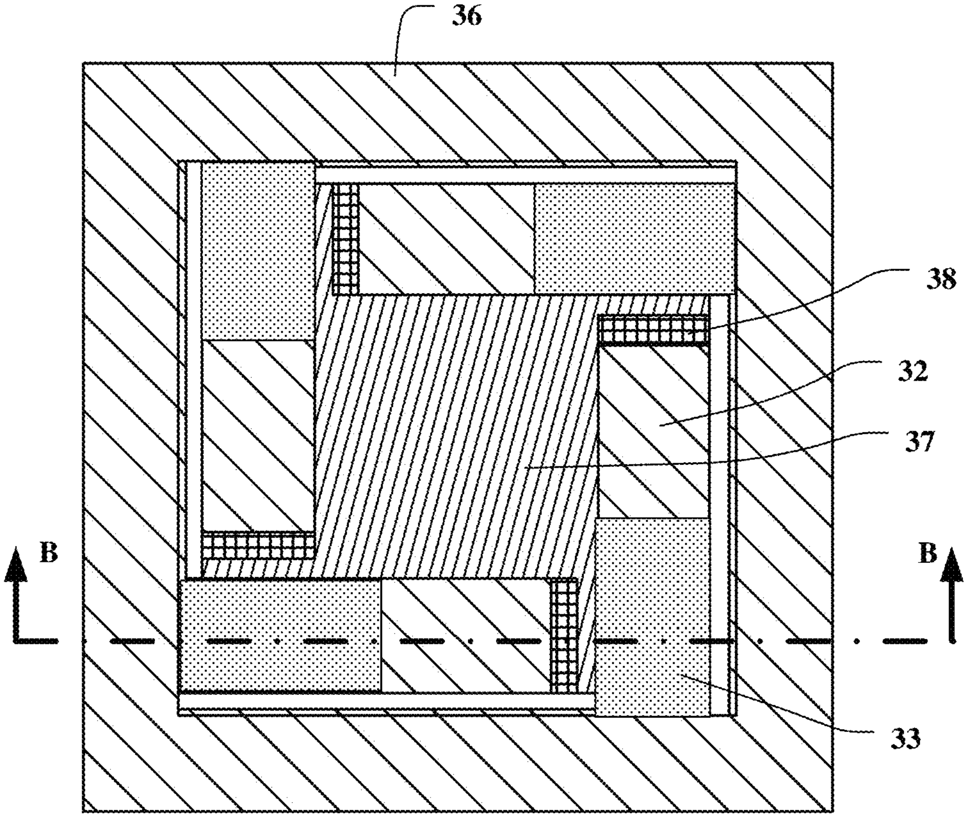
FIG. 10 is a diagram of another top-view structure of an example piezoelectric sensing unit according to an embodiment of this application.
Figure 11:
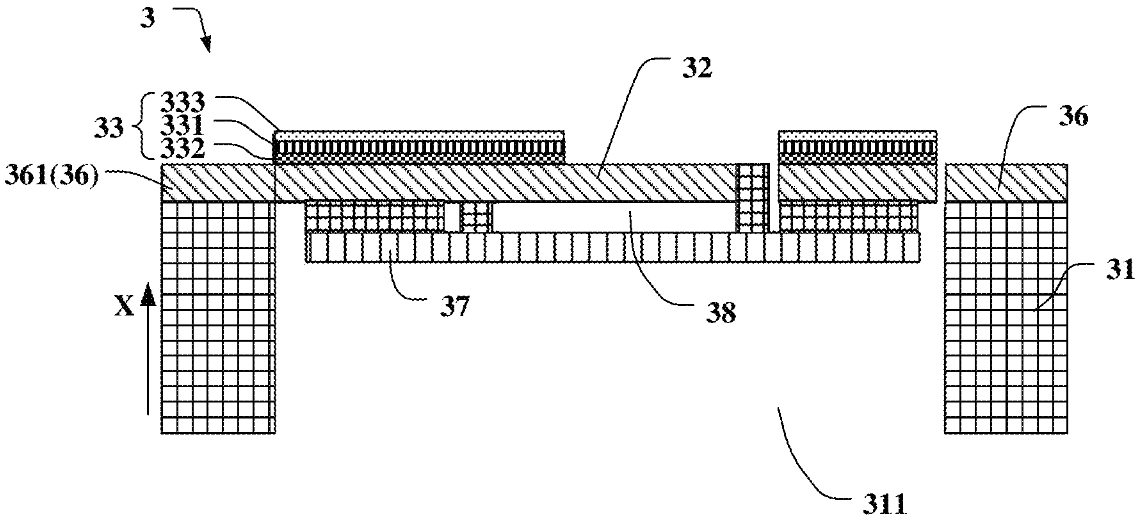
FIG. 11 is a diagram of another lateral sectional-view structure of an example piezoelectric sensing unit according to an embodiment of this application.

In the embodiments shown in FIG. 5 to FIG. 9, a plane on which the central film 37 is located and a plane on which the cantilever 32 is located are a same plane. FIG. 10 is a diagram of another top-view structure of an example piezoelectric sensing unit according to an embodiment of this application. FIG. 11 is a diagram of another lateral sectional-view structure of a piezoelectric sensing unit according to an embodiment of this application. FIG. 11 is a cross-sectional view of B-B in FIG. 10. It should be noted that, for ease of expressing features, FIG. 10 simplifies some features of the accompanying drawing, and shows only a technical feature in this embodiment different from that in another embodiment. As shown in FIG. 10 and FIG. 11, in an embodiment, the central film 37 is located on a side that is of the cantilever 32 and that faces the base 31, and the central film 37 is connected to the cantilever 32 through a connection part 38. In this solution, the central film 37 and the cantilever 32 are located on different planes, sensitivity of the piezoelectric sensing unit 3 is high, and performance of the piezoelectric microphone having the piezoelectric sensing unit 3 is also good.

Because the central film 37 and the cantilever 32 are disposed on different planes, at least a partial structure of the central film 37 may overlap the cantilever 32. In this case, an area of the central film 37 may be large, to increase effectively input sound pressure and improve performance of the piezoelectric microphone.

Figure 12:
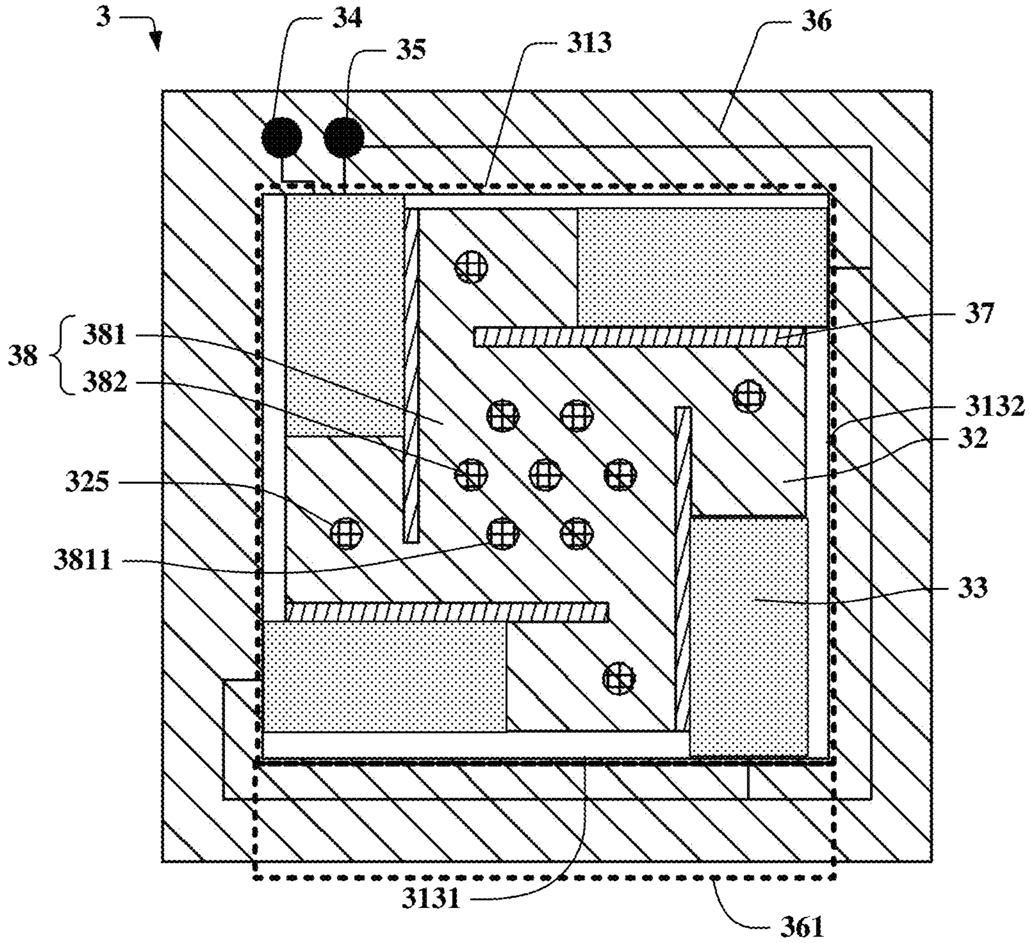
FIG. 12 is a diagram of another top-view structure of an example piezoelectric sensing unit according to an embodiment of this application.
Figure 13:
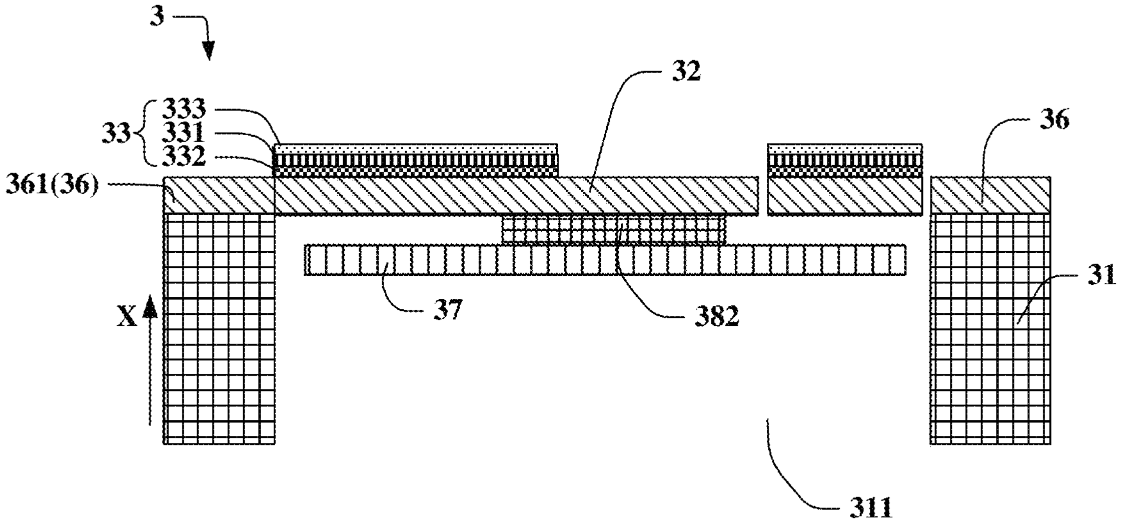
FIG. 13 is a diagram of another lateral sectional-view structure of an example piezoelectric sensing unit according to an embodiment of this application.

To implement a connection between the central film 37 and the second end part 322 of the cantilever 32, the central film 37 may be directly connected to the second end part 322 of the cantilever 32 through the connection part 38, as shown in FIG. 10. Alternatively, FIG. 12 is a diagram of another top-view structure of an example piezoelectric sensing unit according to an embodiment of this application. FIG. 13 is a diagram of a lateral sectional-view structure of an example piezoelectric sensing unit according to an embodiment of this application. As shown in FIG. 12 and FIG. 13, the connection part 38 may further include a first connection part 381 and a second connection part 382. The first connection part 381 and the cantilever 32 form an integrated structure, and the second connection part 382 is connected to the first connection part 381 and the central film 37. According to this solution, connection strength between the central film 37 and the cantilever 32 can be improved, and a service life of the piezoelectric sensing unit 3 can be improved.

The first connection part 381 includes a plurality of first connection holes 3811, and the second connection part 382 is connected to the first connection holes 3811. This helps improve connection strength between the second connection part 382 and the first connection part 381.

Figure 14:
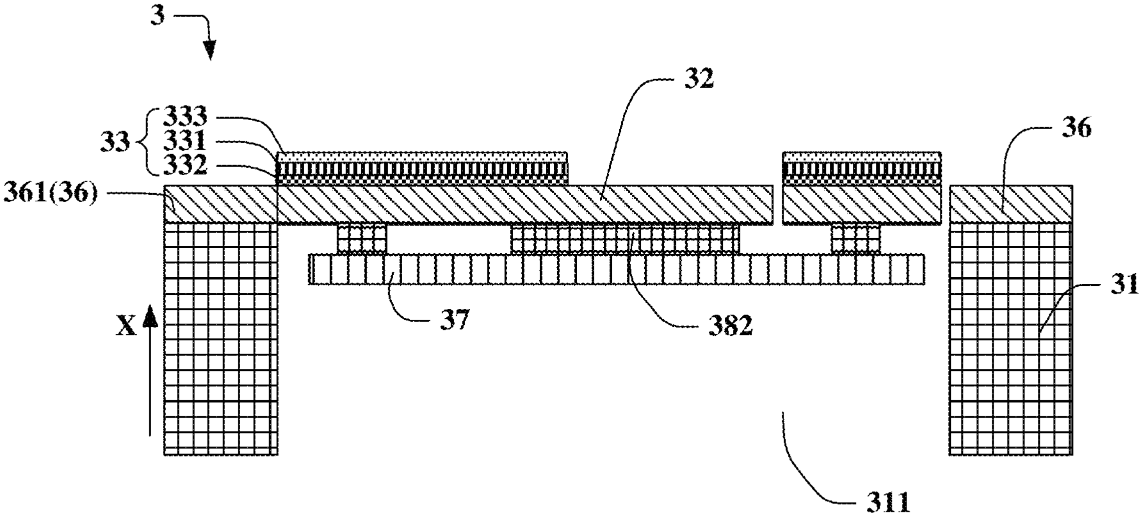
FIG. 14 is a diagram of another lateral sectional-view structure of an example piezoelectric sensing unit according to an embodiment of this application.

FIG. 14 is a diagram of a lateral sectional-view structure of an example piezoelectric sensing unit according to an embodiment of this application. As shown in FIG. 12 and FIG. 14, the cantilever 32 may further include at least one second connection hole 325, where the second connection part 382 is further connected to the second connection hole 325. According to this solution, connection strength between the central film 37 and the cantilever 32 can be improved. Especially, an area of the central film 37 is large. When a partial structure of the central film 37 overlaps the cantilever 32, the central film 37 is connected to the cantilever 32 through the second connection part 382. This helps enable the central film 37 to be in an expanded state.

Figure 15:
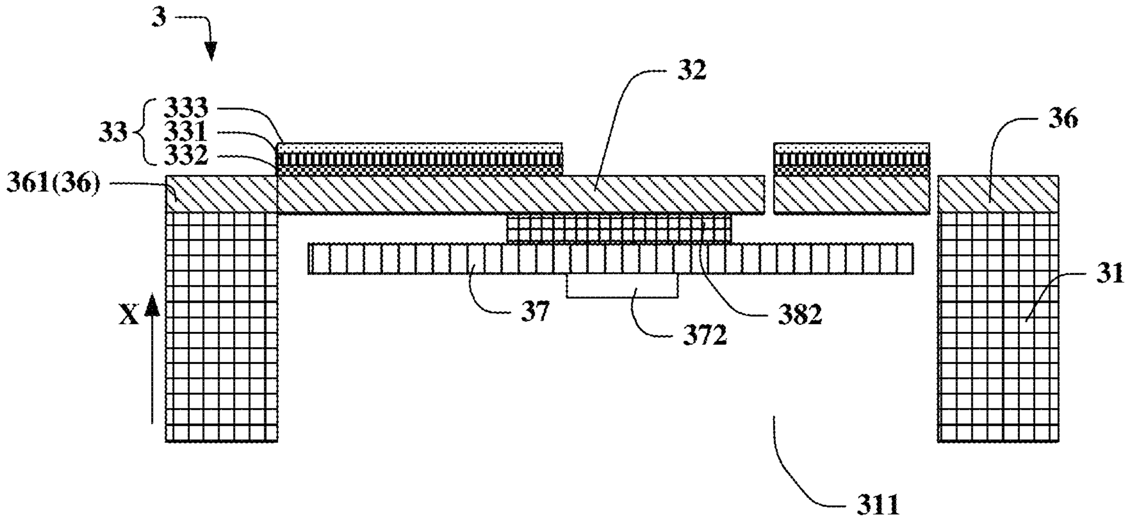
FIG. 15 is a diagram of another lateral sectional-view structure of an example piezoelectric sensing unit according to an embodiment of this application.

FIG. 15 is a diagram of a lateral sectional-view structure of an example piezoelectric sensing unit according to an embodiment of this application. As shown in FIG. 15, the central film 37 may further have an additional mass block 372, to dispose the central film 37. In this solution, when the central film 37 receives sound pressure, a swing amplitude of the central film 37 may be large, to improve sensitivity of the piezoelectric sensing unit 3.

In a specific embodiment, lengths of the plurality of cantilevers 32 in the piezoelectric sensing unit 3 may be the same or may be different. This is not limited in this application. When lengths of the plurality of cantilevers 32 are different, the piezoelectric microphone may have different low-frequency resonant points, and low-frequency sensitivity is high. This can improve a voiceprint recognition capability.

It is clear that a person skilled in the art can make various modifications and variations to this application without departing from the protection scope of this application. In this way, this application is intended to cover these modifications and variations provided that these modifications and variations of this application fall within the scope of the claims of this application and their equivalent technologies.

What is claimed is:

1. A piezoelectric sensing unit, comprising:

a base, forming a cavity extending in a first direction, wherein the cavity forms a polygonal opening on a first surface of the base, and the polygonal opening comprises a first side and a second side that are adjacent to each other;

an auxiliary layer, formed on the first surface of the base, wherein the auxiliary layer comprises a first auxiliary part located in a region that is on the first surface and adjacent to the first side;

a plurality of cantilevers, one-to-one corresponding to sides of the polygonal opening, wherein each cantilever of the plurality of cantilevers comprises a first end part and a second end part that are opposite to each other, the first end part of each cantilever is connected to a side of the first auxiliary part corresponding to the cantilever, the side being close to the second side corresponding to the cantilever, and each cantilever extends along an extension direction of the second side corresponding to the cantilever;

a central film, wherein the central film is connected to the second end part of each of the plurality of cantilevers, and an orthographic projection of the polygonal opening on a first plane completely covers an orthographic projection of the central film on the first plane, wherein the first plane is perpendicular to the first direction; and a plurality of pieces of piezoelectric film, each disposed on a surface of each of the plurality of cantilevers, wherein each of the plurality of pieces of piezoelectric film comprises a piezoelectric material layer, a first electrode layer, and a second electrode layer, and the piezoelectric material layer is connected to the first electrode layer and the second electrode layer, wherein the central film is located on a side of each of the plurality of cantilevers, the side facing the base, and the central film is connected to each of the plurality of cantilevers through a connection part, wherein the connection part comprises a first connection part and a second connection part, the first connection part and the plurality of cantilevers form an integrated structure, and the second connection part is connected to the first connection part and the central film, and wherein the first connection part comprises a plurality of first connection holes, and the second connection part is connected to the plurality of first connection holes.

2. The piezoelectric sensing unit according to claim 1, wherein each cantilever of the plurality of cantilevers comprises a first edge and a second edge that are opposite to each other, and at least one of the first edge or the second edge is parallel to the second side corresponding to the cantilever.

3. The piezoelectric sensing unit according to claim 1, wherein the central film has a hole.

4. The piezoelectric sensing unit according to claim 1, wherein at least a part of the central film overlaps each of the plurality of cantilevers.

5. The piezoelectric sensing unit according to claim 1, wherein each of the plurality of cantilevers comprises at least one second connection hole, and the second connection part is connected to the at least one second connection hole.

6. The piezoelectric sensing unit according to claim 1, wherein, for each of the plurality of cantilevers, a width of the cantilever in a direction perpendicular to the second side corresponding to the cantilever gradually increases or decreases from the first end part to the second end part.

7. The piezoelectric sensing unit according to claim 2, wherein, for each cantilever of the plurality of cantilevers, at least one of the first edge or the second edge of the cantilever is perpendicular to the first side corresponding to the cantilever.

8. The piezoelectric sensing unit according to claim 7, wherein, for each cantilever of the plurality of cantilevers, the first side corresponding to the cantilever has a groove or a protrusion corresponding to the cantilever.

9. The piezoelectric sensing unit according to claim 1, wherein, for each piece of piezoelectric film of the plurality of pieces of piezoelectric film, an effective working region of the piece of piezoelectric film is located on a side of the corresponding cantilever, the side being close to an auxiliary part connected to the corresponding cantilever.

10. The piezoelectric sensing unit according to claim 1, wherein the central film has an additional mass block.

11. The piezoelectric sensing unit according to claim 1, wherein lengths of the plurality of cantilevers are different.

12. The piezoelectric sensing unit according to claim 1, wherein a material of each of the plurality of cantilevers is the same as a material of the piezoelectric material layer.

13. The piezoelectric sensing unit according to claim 1, wherein the auxiliary layer and the plurality of cantilevers form an integrated structure.

14. A piezoelectric microphone, comprising a circuit board, a chip, and the piezoelectric sensing unit according to claim 1, wherein the chip is disposed on the circuit board, and the first electrode layer and the second electrode layer are electrically connected to the chip.

15. The piezoelectric microphone according to claim 14, further comprising a housing, wherein the circuit board, the chip, and the piezoelectric sensing unit are disposed inside the housing.

16. A terminal, comprising a piezoelectric microphone comprising a circuit board, a chip, and the piezoelectric sensing unit according to claim 1, wherein the chip is disposed on the circuit board, and the first electrode layer and the second electrode layer are electrically connected to the chip.

* * * * *